(No Model.)
J. AVERY.
ATTACHMENT FOR TAPE MEASURE CASES.
No. 268,168. Patented Nov. 28, 1882.
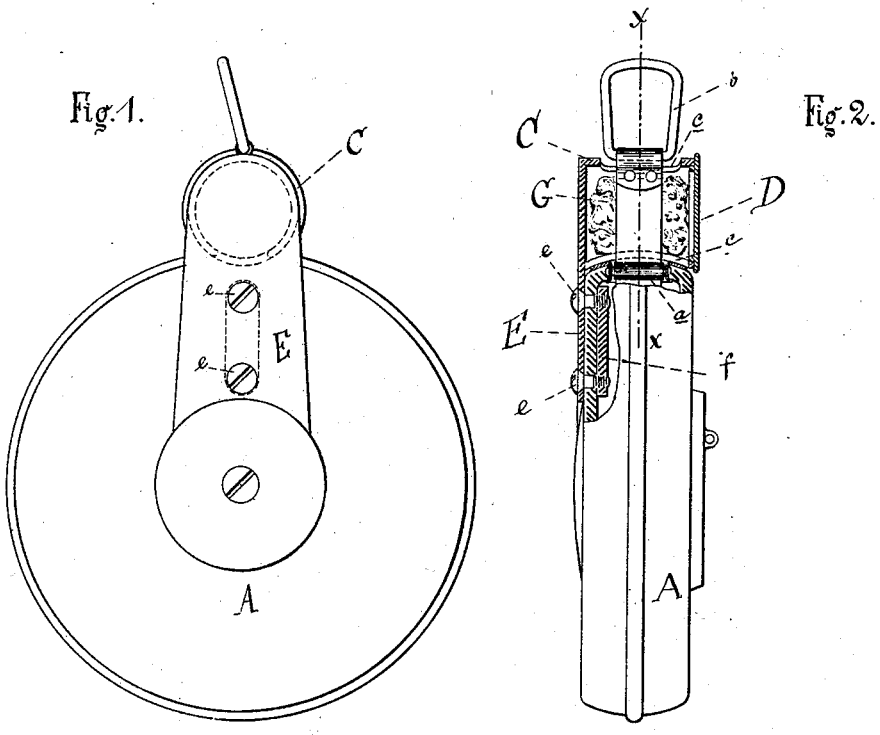
WITNESSES:
F. H. Moore
Bennett Van Zandt.
INVENTOR
John Avery
BY Francis C. Bowen
ATTORNEY

UNITED STATES PATENT OFFICE.

JOHN AVERY, OF NEW YORK, N. Y.

ATTACHMENT FOR TAPE-MEASURE CASES.

SPECIFICATION forming part of Letters Patent No. 268,168, dated November 28, 1882.

Application filed June 15, 1882. (No model.)

*To all whom it may concern:*

Be it known that I, JOHN AVERY, a citizen of the United States, residing at New York, in the county of New York and State of New York, have invented certain new and useful Improvements in Attachments for Measuring-Lines, of which the following is a specification, reference being had therein to the accompanying drawings.

My invention relates to measuring-lines or "tape-measures," such as are inclosed in a cylindrical casing or frame and adapted to be wound around a spindle, either by hand or automatically by means of a spring. In an apparatus of such a character, the tape composing the measuring-line is liable to become soiled, and in consequence thereof rusty, by the passage between the fingers of one hand while being wound or unwound, either by the other hand or automatically by means of a spring.

To obviate this disadvantage is the object of my invention; and to this end my invention consists essentially in a casing for holding suitable fibrous or other material, and adapted to be attached to the casing which contains the measuring-line, so that said measuring-line will pass through said fibrous or other material saturated with oil when being wound or unwound, and thus be kept clean and prevented from becoming rusty.

The accompanying drawings illustrate the manner of carrying out my invention.

Figure 1 is a side view of my invention as applied to the casing of a measuring-line. Fig. 2 is an edge view, partly in section. Fig. 3 is a section taken in the line *x x* of Fig. 2, the casing being removed.

A represents the casing of an ordinary measuring-line, and B the tape-measure, having its outer end provided with a ring or loop, *b*.

C is a cylindrical casing, of a length equal to the thickness of the casing A, more or less. One end of the casing C is provided with a removable head or cap, D, which may be either screw-threaded or simply be made to fit tightly like a plug or lid. The opposite end of the casing is made with or permanently attached to it, and is elongated or extended from one side, so as to form a flat bar, E, which is attached to one side of the casing A by screws *e* passing through holes in said casing and into threaded holes in a plate, *f*, on the inner side, as shown in Fig. 2, or by rivets or any other means.

In the casing C, diametrically opposite each other, are two slots, *c c*, which are also opposite the slot in the casing A through which the tape-line B leaves the casing, after which said line is passed through said slots to the outside of the casing C.

Inside the casing C is placed a filling or packing, G, of rubber, cotton, muslin, threads, or other suitable fibrous material, arranged on both sides of the tape-line, and preferably saturated with oil.

The slot in the casing A may be provided with friction-rollers *a*, as usual.

When the tape-line is being either drawn out or wound up it passes between the packing or filling G, which wipes off any moisture, dust, or dirt which may have collected thereon, and thus keeps it clean, and by the oil contained in the filling G covers the whole tape with a thin coat and prevents corrosion.

What I claim as new, and desire to secure by Letters Patent, is—

1. The casing C, provided with the removable head or cap D and arm or flat bar E, substantially as and for the purpose herein described.

2. The combination of the casing A, provided with friction-rollers *a*, the casing C, provided with slots *c c*, and the packing or filling G, substantially as and for the purpose herein described.

3. The combination of the casing A, the casing C, provided with the arm or flat bar E, the screws *e*, and the fastening-plate *f*, substantially as and for the purpose herein described.

In testimony whereof I affix my signature in presence of two witnesses.

JOHN AVERY.

Witnesses:
 FRANCIS CLARE BOWEN,
 BENNETT VAN ZANDT.